US012419809B2

(12) United States Patent
Hernandez

(10) Patent No.: US 12,419,809 B2
(45) Date of Patent: *Sep. 23, 2025

(54) BABY BOTTLE WITH BUILT-IN PROTECTOR

(71) Applicant: Janira Hernandez, Chicago, IL (US)

(72) Inventor: Janira Hernandez, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,449

(22) Filed: Feb. 6, 2023

(65) Prior Publication Data

US 2023/0172811 A1 Jun. 8, 2023

Related U.S. Application Data

(63) Continuation of application No. 17/384,534, filed on Jul. 23, 2021, now Pat. No. 11,571,364.

(51) Int. Cl.
*A61J 11/00* (2006.01)
*A61J 9/00* (2006.01)
*A61J 11/04* (2006.01)
*B65D 43/16* (2006.01)
*B65D 47/08* (2006.01)

(52) U.S. Cl.
CPC ............... *A61J 11/008* (2013.01); *A61J 9/00* (2013.01); *A61J 11/04* (2013.01); *B65D 43/16* (2013.01); *B65D 47/08* (2013.01)

(58) Field of Classification Search
CPC ..... A61J 11/008; A61J 11/0075; B65D 43/16; B65D 47/08; B65D 47/0804; B65D 47/0857
USPC ........................................................ 215/11.6
See application file for complete search history.

(56) References Cited

U.S. PATENT DOCUMENTS 976,887 A * 11/1910 Ladley .................... A61J 11/008 215/11.1
1,018,831 A * 2/1912 Ladley .................... A61J 11/008 215/11.6
1,258,766 A * 3/1918 Gullery .................. A61J 11/008 215/11.6
5,578,058 A 11/1996 Chen
2012/0318800 A1 12/2012 Chen
2018/0360694 A1 12/2018 Frisch et al.

FOREIGN PATENT DOCUMENTS

WO WO-2006/010935 A1 2/2006
WO WO-2009/047396 A2 4/2009

OTHER PUBLICATIONS

International Search Report & Written Opinion for PCT/US2022/038078 dated Oct. 26, 2022, 7 pages.
Notice of Allowance on U.S. Appl. No. 17/384,534 dtd Oct. 7, 2022 (9 pages).

* cited by examiner

*Primary Examiner* — Nathan J Jenness
*Assistant Examiner* — Jennifer Castriotta
(74) *Attorney, Agent, or Firm* — Foley & Lardner LLP

(57) ABSTRACT

An infant feeding bottle assembly includes a container and a top assembly including a collar coupled to the container at a top portion of the container, a nipple, and a nipple protector. The collar further includes a holding portion. The nipple protector is coupled to the collar and is capable of transitioning between an open state and a closed state. In the closed state, the nipple protector covers and protects the nipple. In the open state, the nipple protector retracts into or rests on the holding portion and exposes the nipple.

19 Claims, 6 Drawing Sheets

BABY BOTTLE WITH BUILT-IN PROTECTOR

CROSS-REFERENCE TO RELATED PATENT APPLICATIONS

This application is a continuation application of U.S. patent application Ser. No. 17/384,534, filed Jul. 23, 2021, incorporated herein by reference in its entirety.

TECHNICAL FIELD

The present disclosure relates to infant feeding bottles and particularly an infant feeding bottle assembly for dispensing liquid that prevents spillage and protects the nipple.

BACKGROUND

Infant feeding bottles often have a top that detaches from the main bottle to reveal the nipple. However, because the top is a separate piece, the top can be easily lost after it is removed from the bottle. Without the top, the liquid inside the bottle is able to spill from the bottle. Additionally, the nipple is exposed to the environment, which can cause unwanted contamination of the nipple.

Therefore, there is a need for an infant feeding bottle with a top that protects the nipple, prevents spilling, and is not easily lost.

SUMMARY OF THE INVENTION

Embodiments described herein relate generally to an infant feeding bottle assembly, and particularly a top assembly to cover the nipple so that a separate top is not needed and the nipple can remain protected when not in use.

One embodiment relates to an infant feeding bottle assembly including a container, such as a bottle, and a top assembly comprising a collar coupled to the container at a top portion of the container, a nipple, and a nipple protector. The collar may be coupled to the top portion of the container by, for example, screwing the collar onto the top portion of the container. The collar contains a holding portion, such as a ring-shaped groove or channel, that extends in a peripheral direction about a central axis. The collar, nipple, and nipple protector are centered on the central axis, and the nipple extends along the central axis away from the top portion of the container. The nipple protector is coupled to the collar and is capable of transitioning between an open state and a closed state. In the closed state, the nipple protector covers and protects the nipple. In the open state, the nipple protector exposes the nipple. The nipple protector may include one or several portions that cooperate to cover the nipple in the closed state or expose the nipple in the open state.

In one embodiment, in the open state, the portions of the nipple protector collapse and the nipple extends from the container beyond the nipple protector such as to allow a baby sufficient clearance to engage with the nipple. In the closed state, the portions of the nipple protector are extended such that they engage each other to seal the nipple from exposure to the environment. In some embodiments, the nipple protector is a sphere cap, such as a hemisphere, where each of the portions of the nipple protector comprise a segment of the sphere cap. It should be appreciated that the nipple protector may include one or more portions, which may be of equal size or of differing sizes. For example, where the sphere cap is a hemisphere, two nipple protector portions may be utilized, each having a quarter sphere shape (half of the hemisphere).

In some embodiments, the nipple protector is in the shape of a hemisphere. The hemisphere is comprised of a first protector portion and a second protector portion. Both the first protector portion and the second protector portion are capable of transitioning between a closed state and an open state. When both the first protector portion and the second protector portion are in the closed state, the first protector portion and the second protector portion come together to form the hemisphere. When both the first protector portion and the second protector portion are in a closed state, the nipple is covered by both the first protector portion and the second protector portion, and the nipple is unexposed. In the closed state, the first protector portion and the second protector portion may be held together by a connecting mechanism. In some embodiments, the connecting mechanism may include a first connector and a second connector, such as a clip or clasp, coupled to the first protector portion and the second protector portion, respectively. When either of the first protector portion or the second protector portion is in the open state, the nipple is exposed to the environment. In some embodiments, when either the first protector portion or the second protector portion is in the open state, the first protector portion and/or the second protector portion may be held down in the holding portion of the collar by the first connector and the second connector, respectively. In some embodiments, in the open state, the first protector portion and/or the second protector portion may rest on the holding portion of the collar.

In some embodiments, the first protector portion and the second protector portion of the nipple protector include a plurality of ribs. Each rib is arc-shaped and is hingedly connected to the collar. A webbing connects each rib of the plurality of ribs. The webbing may be made of a soft, pliable material, such as a plastic comprised of polyethylene or polypropylene. When either the first protector portion or second protector portion is in the closed state, the webbing extends between the plurality of ribs such as to create the hemisphere shape of the nipple protector. In the open state, the plurality of ribs may collapse and rest in or on the holding portion of the collar.

DETAILED DESCRIPTION

Before turning to the FIGURES, which illustrate certain exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

Referring generally to the FIGURES, disclosed herein is an infant feeding bottle assembly including features that dispense liquid without spilling while also being able to protect the nipple from the environment.

Figure 1:
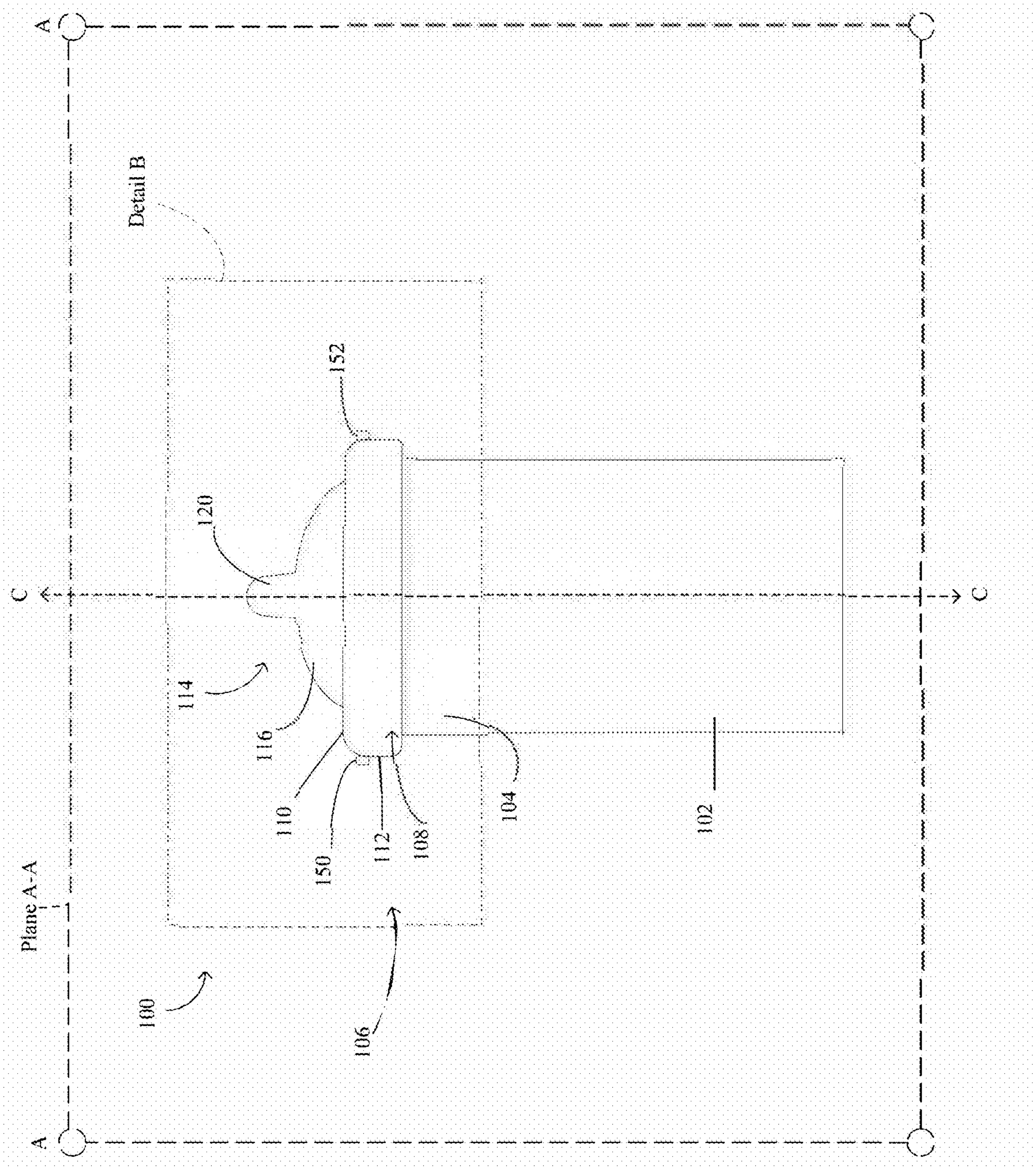
FIG. 1 is a side view of an infant feeding bottle assembly, according to an exemplary embodiment, shown with the nipple protector in the open state.

Referring to FIG. 1, the infant feeding bottle assembly 100 includes a container 102 (e.g., bottle, etc.). The container 102 holds a liquid, such as infant formula for an infant to consume. The container 102 includes a top portion 104 configured to be coupled to another portion, as described herein. The infant feeding bottle assembly 100 also includes a top assembly 106. The top assembly 106 includes a collar 108. The container 102 is coupled to the top assembly 106 by, for example, removably engaging the collar 108 with the top portion 104 of the container 102. Removably engaging the collar 108 with the top portion 104 may be accomplished through a threaded engagement, a slot and groove arrangement, a snap-fit, friction fit, or the like. The collar 108 contains a holding portion 110 (e.g., groove, channel, rim, etc.) that extends in a peripheral direction about a central axis C. The collar 108 may also include a liner 112. The liner 112 covers a surface of the holding portion 110 and may be made of a flexible material with a high coefficient of friction (e.g., silicone, latex, rubber, etc.). The liner 112 creates a soft surface around the collar 108 to protect an infant while the infant feeding bottle assembly 100 is in use.

In some embodiments, the top assembly 106 further includes a nipple 114. The nipple 114 extends along the central axis C away from the top portion 104 of the container 102. Preferably, the nipple 114 is made of a safe and hygienic material (e.g., food grade silicone, polyethylene, polypropylene, etc.) The nipple 114 includes a base portion 116. The base portion 116 extends to the collar 108 and has a bulbous shape that extends outwardly and away from the top portion 104 of the container 102 along the central axis C. Because the base portion 116 has a bulbous shape that extends to the collar 108, the nipple 114 is able to mimic a natural breastfeeding process. The base portion 116 may also include a vent opening 118 to permit air to pass between an interior and an exterior of the container 102 to encourage flow of a liquid from inside the container 102 to outside the container 102. The nipple 114 further includes a spout 120. The spout 120 is centered on the base portion 116 and extends outwardly and away from the base portion 116 along the central axis C. An opening 122 in the spout 120 permits liquid to escape from the container 102, such as when an infant engages with the nipple 114 to feed.

Figure 2:
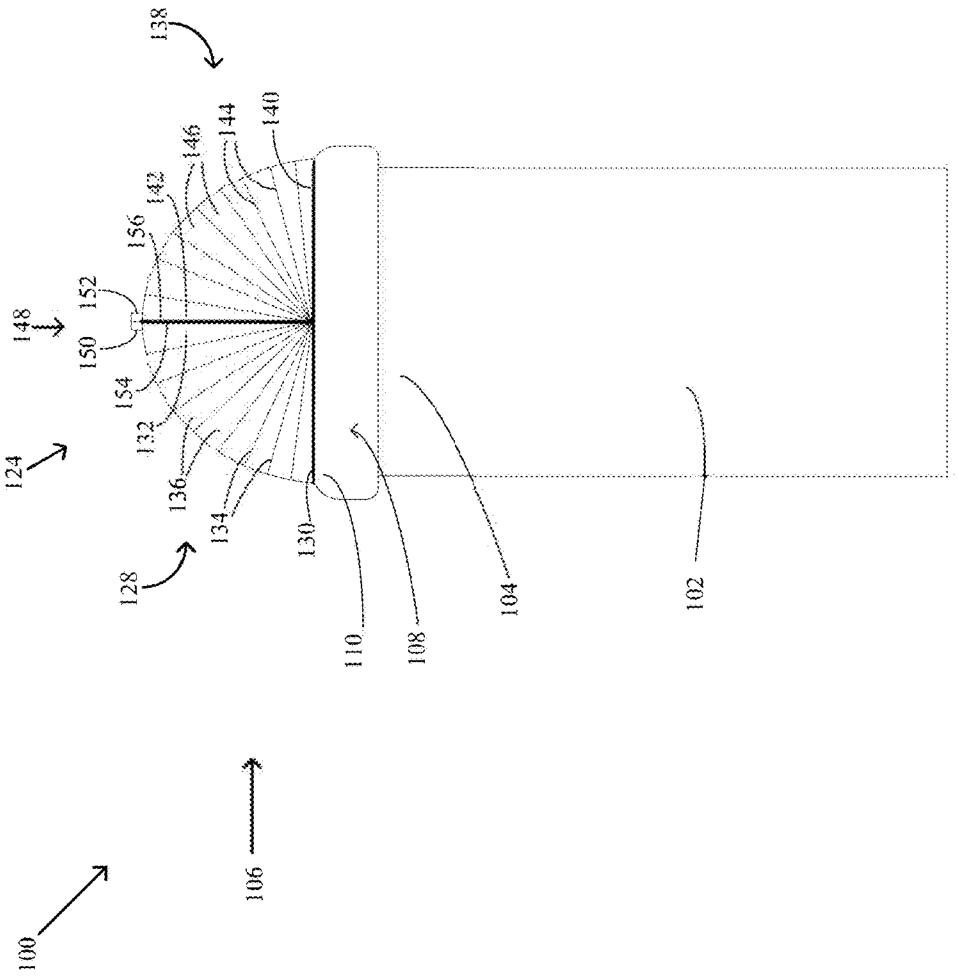
FIG. 2 is a side view of the infant feeding bottle assembly of FIG. 1 shown with the nipple protector in the closed state.

Referring to FIG. 2, the top assembly 106 further includes a nipple protector 124. The nipple protector 124 is coupled to the collar 108 and is configured to transition between an open state and a closed state. When the top assembly 106 is coupled to the top portion 104 of the container 102, the top assembly 106 is capable of defining an enclosed space 126 between the nipple protector 124 and the container 102 in which the nipple 114 is located.

In some embodiment, the nipple protector 124 is in the shape of a hemisphere. The nipple protector 124 includes a first protector portion 128. The first protector portion 128 has a first mounting end 130 coupled to the collar 108. The first protector portion 128 also includes a first moving end 132 that moves to transition the first protector portion 128 between the open state and the closed state. A first plurality of ribs 134 is disposed between the first moving end 132 and the first mounting end 130. The first mounting end 130, the first moving end 132, and the first plurality of ribs 134 are connected by a first webbing 136. Similarly, the nipple protector 124 includes a second protector portion 138. The second protector portion 138 has a second mounting end 140 coupled to the collar 108. The second protector portion 138 also includes a second moving end 142 that moves to transition the second protector portion 138 between the open state and the closed state. A second plurality of ribs 144 is disposed between the second moving end 142 and the second mounting end 140. The second mounting end 140, the second moving end 142, and the second plurality of ribs 144 are connected by a second webbing 146. It should be appreciated the ribs of the first plurality of ribs 134 and the ribs of the second plurality of ribs 144 may vary in size and are arc-shaped to create the hemisphere shape of the nipple protector 124.

In some embodiments, the first protector portion 128 and the second protector portion 138 of the nipple protector 124 are configured to transition between the closed state and the open state. In the closed state, the nipple protector 124 defines the enclosed space 126 and covers the nipple 114. In the open state, the nipple 114 is exposed. Referring to FIG. 2, in the closed state, the first moving end 132 and the second moving end 142 are in confronting relation with one another such that the enclosed space 126 is defined between the nipple protector 124 and the container 102. Because the nipple 114 is disposed within the enclosed space 126, in the closed state, the nipple 114 is unexposed and is protected from the environment. In some embodiments, the nipple protector 124 is configured to be biased, secured or locked in the closed state. For example, in the closed state, the first moving end 132 and the second moving end 142 may be held in confronting relation with one another by a connecting mechanism 148. The connecting mechanism 148 may be, for example, a physical connection, such as a clip, clasp, snap-fit or the like, or may utilize a force such as adhesion or magnetic attraction, as in the use of an adhesive or magnet or the like. In some embodiments, the connecting mechanism 148 includes a first connector 150 and a second connector 152. The first connector 150 is coupled to the first moving end 132 at a first location and is engageable with the second connector 152. The second connector 152 is coupled to the second moving end 142 at a second location offset from the first location and is engageable with the first connector 150. Therefore, in the closed state, when the first connector 150 and the second connector 152 are engaged with one another, such as by pushing the first connector 150 and the second connector 152 past one another, the first protector portion 128 and the second protector portion 138 maintain contact along the first moving end 132 and the second moving end 142 such as to remain in the closed state.

In some embodiments, the first moving end 132 is lined with a first sealing member 154 (e.g., lip, seal, etc.) made of a flexible material with a high coefficient of friction (e.g., silicone, latex, rubber, etc.). Similarly, the second moving end 142 is lined with a second sealing member 156 made of a flexible material with a high coefficient of friction. Consequently, in the closed state, when the first moving end 132 and the second moving end 142 are brought into confronting relation with one another, the first sealing member 154 and the second sealing member 156 contact one another such as to form an air-tight seal. The first connector 150 and the second connector 152 hold the first protector portion 128 and second protector portion 138 in the closed state such that the first sealing member 154 and the second sealing member 156 maintain the air-tight seal.

Figure 3:
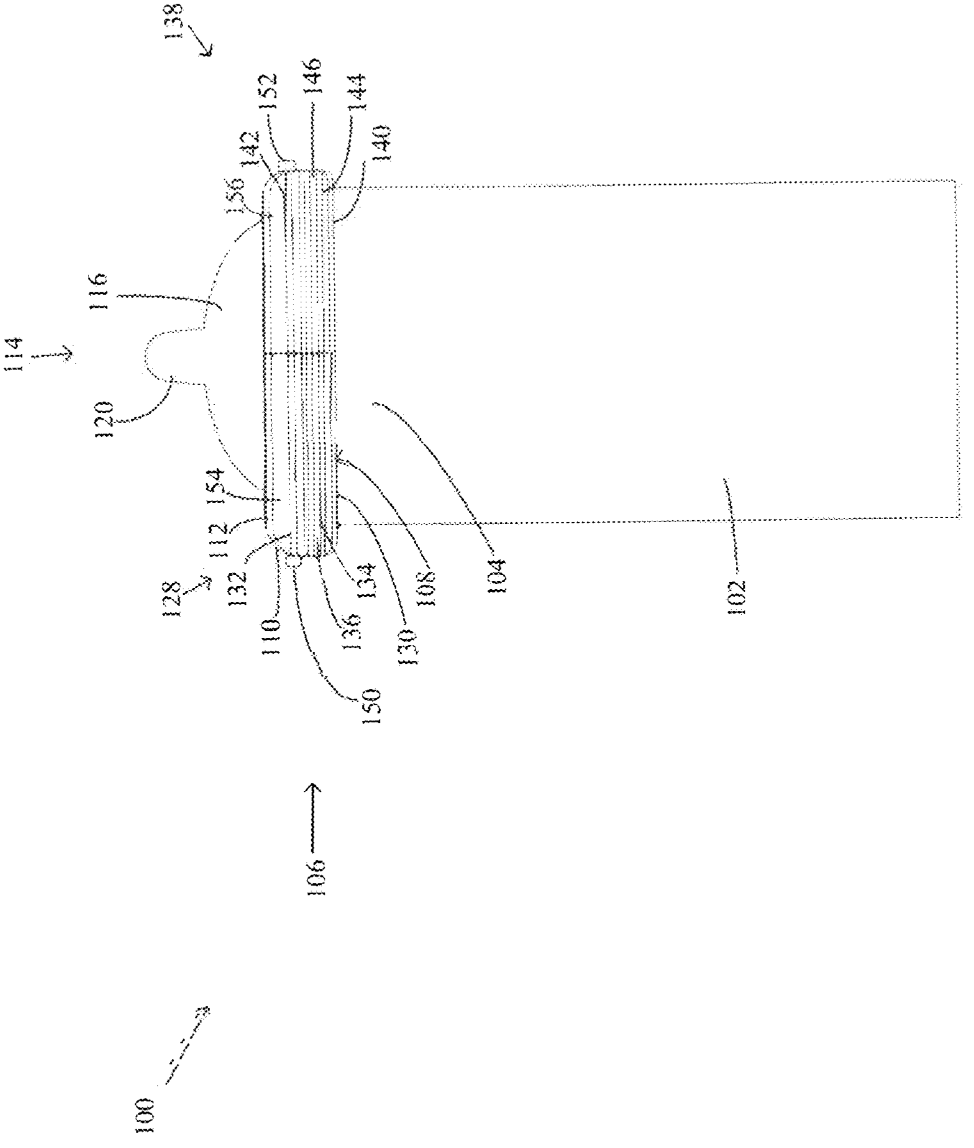
FIG. 3 is a cross sectional view along plane A-A of the infant feeding bottle assembly of FIG. 1 shown with the nipple protector in the open state.
Figure 4:
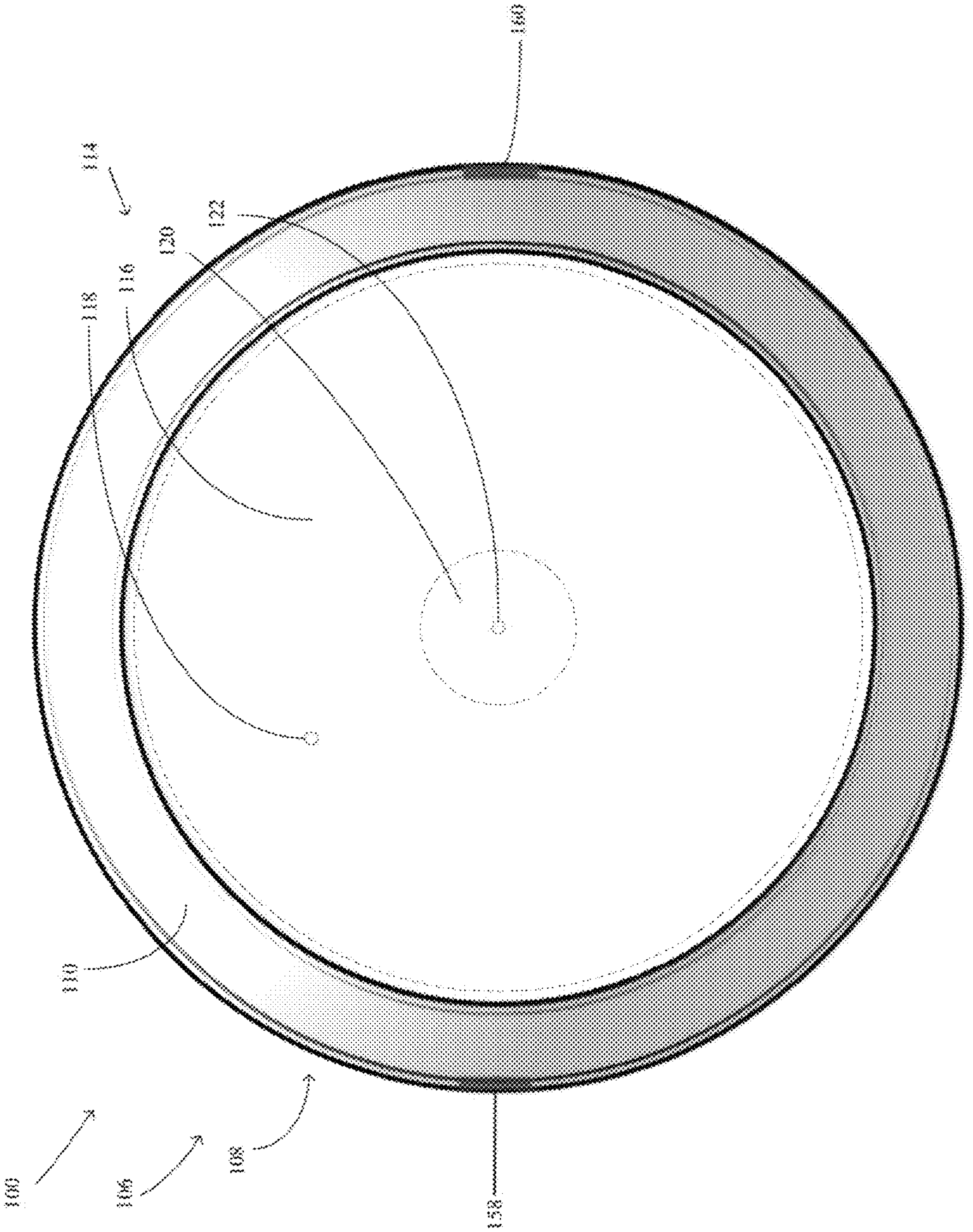
FIG. 4 is a top view of the infant feeding bottle assembly of FIG. 1 without the nipple protector.
Figure 5:
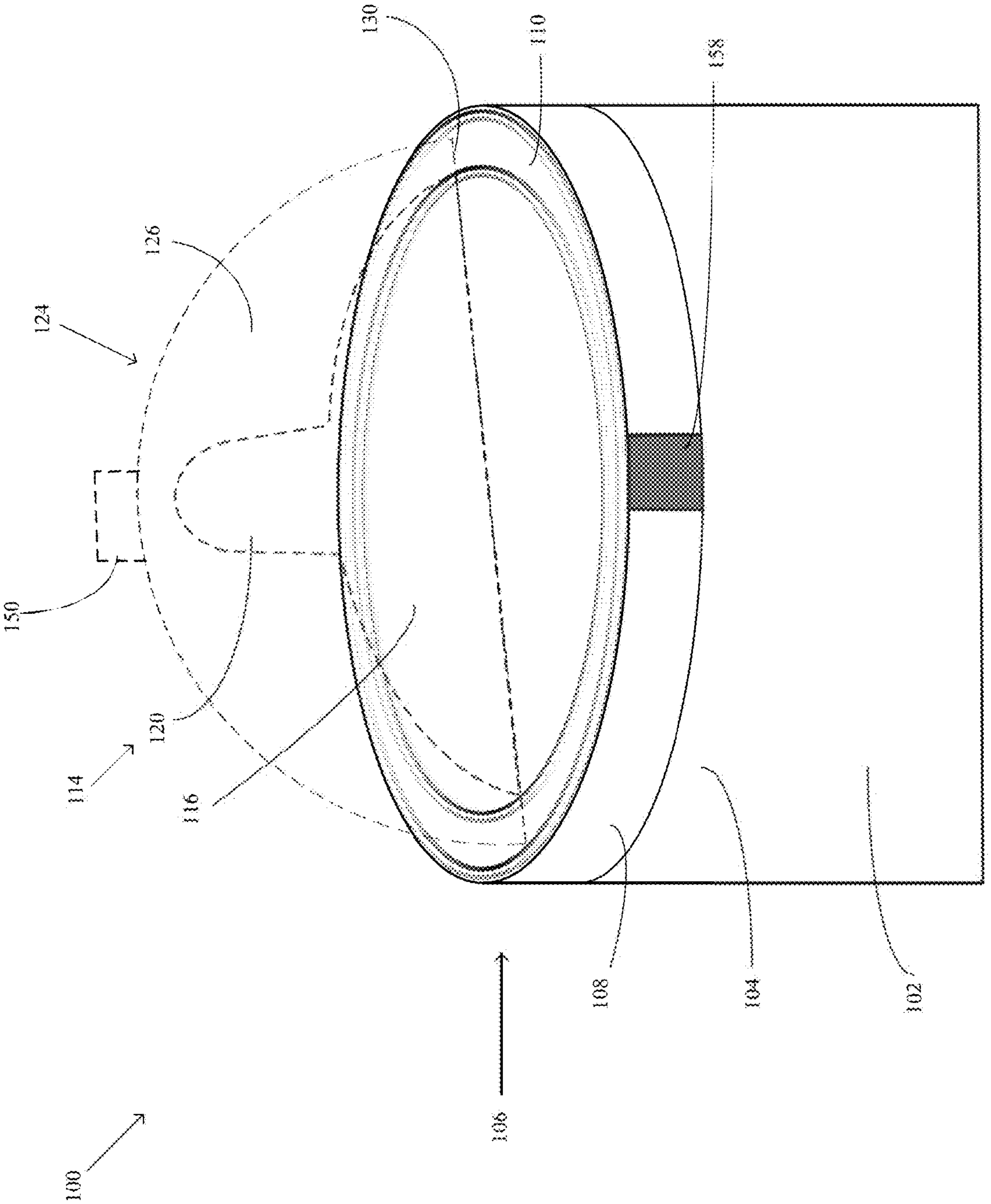
FIG. 5 is a perspective view of Detail B of the infant feeding bottle assembly of FIG. 1.
Figure 6:
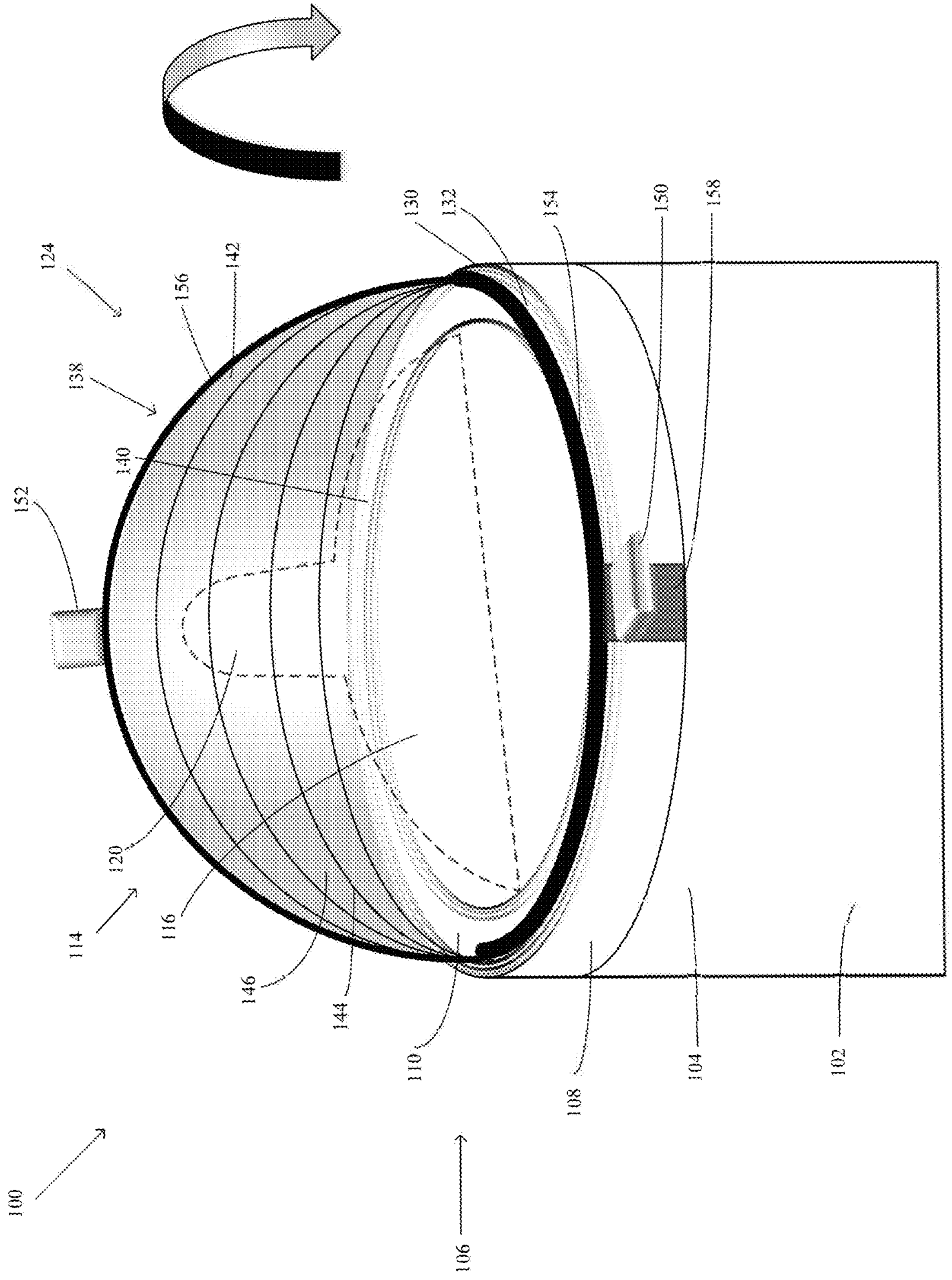
FIG. 6 is a perspective view of Detail B the infant feeding bottle assembly of FIG. 1 with the first protector portion in the open state and the second protector portion in the closed state.

Referring to FIG. 3, to transition the first protector portion 128 to the open state, the first moving end 132 is moved towards the first mounting end 130 such that the first plurality of ribs 134 collapse and the first moving end 132 is in confronting relation with the first mounting end 130. To transition the second protector portion 138 to the open state, the second moving end 142 is moved towards the second mounting end 140 such that the second plurality of ribs 144 collapse and the second moving end 142 is in confronting relation with the second mounting end 140.

In some embodiments, the nipple protector 124 is configured to be biased, secured, or locked in the open state. For example, in some embodiments, the holding portion 110 of the collar is a groove or channel. The holding portion 110 includes a first accommodating space 158 configured to receive the first connector 150. When the first protector portion 128 transitions to the open state as described above, the first connector 150 is inserted into the first accommodating space 158 to hold the first protector portion 128 within the holding portion 110. Similarly, the holding portion 110 includes a second accommodating space 160 configured to receive the second connector 152. When the second protector portion 138 transitions to the open state, the second connector 152 is inserted into the second accommodating space 160 to hold the second protector portion 138 in the holding portion 110. In some embodiments, the holding portion 110 is a rim of the collar 108 rather than the groove or channel. In some embodiments, the first moving end 132 may rest above the first mounting end 130 on the holding portion 110 rather than being pressed down into the holding portion 110. Similarly, the second moving end 142 may rest above the second mounting end 140 on the holding portion 110 rather than being pressed down into the holding portion 110.

In some embodiments, the first sealing member 154 and the second sealing member 156 may also facilitate biasing, securing, or locking the nipple protector 124 in the open state. For example, in some embodiments, the holding portion 110 of the collar 108 is the groove and is covered with the liner 112. In the open state, the first protector portion 128 collapses and is pressed down into the holding portion 110 such that the first protector portion 128 fills the holding portion 110. Because the liner 112 and the first sealing member 154 are each made of a flexible material with a high coefficient of friction, the liner 112 and the first sealing member 154 grip one another such as to secure the first protector portion 128 in the holding portion 110. Similarly, in the open state, the second protector portion 138 collapses and is pressed down into the holding portion 110 such that the second protector portion 138 fills the holding portion 110. Because the liner 112 and the second sealing member 156 are both made of a flexible material with a high coefficient of friction, the liner 112 and the second sealing member 156 grip one another such as to secure the second protector portion 138 in the holding portion 110.

In some embodiments, the first protector portion 128 may be further secured in the holding portion 110 by the connecting mechanism 148. For example, the connecting mechanism 148 may include the first connector 150. The first connector 150 is coupled to the first moving end 132 such that movement of the first connector 150 results in movement of the first protector portion 128. Further, the holding portion 110 may include the first accommodating space 158. In some embodiments, when the first protector portion 128 is pressed down into the holding portion 110, the first connector 150 is pressed into the first accommodating space 158 to secure the first protector portion 128 in the open state. Preferably, the first accommodating space 158 is an opening in the collar 108 such that when the first connector 150 is pressed into the first accommodating space 158, the first connector 150 protrudes or extends radially away from the collar 108. This allows a user to easily grip the first connector 150 to transition the first protector portion 128 between the open state and closed state. Further, because the first connector 150 protrudes or extends radially away from the collar 108, the first connector 150 is positioned away from the infant when the infant is engaged with the infant feeding bottle assembly 100.

In some embodiments, the second protector portion 138 may also be secured in the holding portion 110 by the connecting mechanism 148. For example, the connecting mechanism 148 may include the second connector 152. The second connector 152 is coupled to the second moving end 142 such that movement of the second connector 152 results in movement of the second protector portion 138. Further, the holding portion 110 may include the second accommodating space 160. In some embodiments, when the second protector portion 138 is pressed down into the holding portion 110, the second connector 152 is pressed into the second accommodating space 160 to secure the second protector portion 138 in the open state. Preferably, the second accommodating space 160 is an opening in the collar 108 such that when the second connector 152 is pressed into the second accommodating space 160, the second connector 152 protrudes or extends radially away from the collar 108. This allows a user to easily grip the second connector 152 to transition the second protector portion 138 between the open state and the closed state. Further, because the second connector 152 protrudes or extends radially away from the collar 108, the second connector 152 is positioned away from the infant when the infant is engaged with the infant feeding bottle assembly 100.

It should be appreciated that in some embodiments, the nipple protector 124 is only the first protector portion 128 rather than including both the first protector portion 128 and the second protector portion 138. For example, the first protector portion 128 includes the first mounting end 130, the first moving end 132, and the first connector 150, and may be a continuous hemisphere. In some embodiments, the first protector portion 128 includes the first plurality of ribs 134 disposed between the first mounting end 130 and the first moving end 132. The first mounting end 130, the first moving end 132, and the first plurality of ribs 134 are connected by the first webbing 136. Each rib of the first plurality of ribs 134 is arc-shaped such that the first plurality of ribs 134 and the first webbing 136 create the surface of the hemisphere. The first plurality of ribs 134 are hingedly connected to the collar 108. The first webbing 136 may be made of a soft, pliable material, such as a plastic comprised of polyethylene or polypropylene. The holding portion 110 includes the first accommodating space 158 and the second accommodating space 160. However, both the first accommodating space 158 and the second accommodating space 160 are configured to receive the first connector 150. In this embodiment, in the closed state, the first connector 150 is disposed within either the first accommodating space 158 or the second accommodating space 160. In the open state, the first connector 150 is disengaged from either the first accommodating space 158 or the second accommodating space 160 such that first plurality of ribs 134 collapse and the first moving end 132 moves towards the first mounting end 130. The first connector 150 engages with the other of the first accommodating space 158 and the second accommodating space 160 such that the first protector portion 128 remains in the open state.

No claim element herein is to be construed under the provisions of 35 U.S.C. § 112(f), unless the element is expressly recited using the phrase "means for."

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or movable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, and/or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the tolerance compensators and the components/elements, as shown in the various exemplary embodiments, are illustrative only. Additionally, any element disclosed in an exemplary embodiment may be incorporated or utilized with any other embodiment disclosed herein. Although only one example of an element from an exemplary embodiment that can be incorporated or utilized in another embodiment has been described above, it should be appreciated that other elements of the various embodiments may be incorporated or utilized with any of the other embodiments disclosed herein.

What is claimed is:

1. A top assembly configured to be coupled to a container, the top assembly comprising:

a collar having a holding portion extending in a peripheral direction about a central axis of the collar;

a nipple coupled to the collar;

a nipple protector coupled to the collar and configured to cover the nipple, the nipple protector having a plurality of ribs hingedly connected to the collar; and a webbing that connects the plurality of ribs.

2. The top assembly of claim 1, wherein:

the nipple protector comprises:

a first protector portion comprising a first mounting end and a first moving end, a second protector portion comprising a second mounting end and a second moving end;

the plurality of ribs comprises a first plurality of ribs and a second plurality of ribs; and the webbing comprises a first webbing and a second webbing;

wherein the first plurality of ribs is disposed between the first mounting end and the first moving end, the first webbing connecting the ribs of the first plurality of ribs to the first mounting and the first moving end, wherein the second plurality of ribs is disposed between the second mounting end and the second moving end, the second webbing connecting the ribs of the second plurality of ribs to the second mounting and the second moving end.

3. The top assembly of claim 2, wherein the first mounting end is coupled to a first half of the collar and the second mounting end is coupled to a second half of the collar.

4. The top assembly of claim 3, wherein:

the first moving end and the second moving end are configured to move between a closed state and an open state, wherein, in the closed state, the first moving end and the second moving end are in confronting relation with each other such that an enclosed space is created between the nipple protector and the container, the nipple being disposed within the enclosed space, wherein, in the open state, the first plurality of ribs collapse such that the first moving end is in confronting relation with the first mounting end, and wherein, in the open state, the second plurality of ribs collapse such that the second moving end is in confronting relation with the second mounting end.

5. The top assembly of claim 4, further comprising a connecting mechanism comprising a first connector and a second connector, wherein:

the first connector is coupled to the first moving end and the second connector is coupled to the second moving end, and in the closed state, the first connector engages with the second connector such that the first protector portion and the second protector portion remain in the closed state.

6. The top assembly of claim 5, wherein:

the holding portion is a groove in the collar, the holding portion comprises a first accommodating space and a second accommodating space, in the open state, the first connector is disposed within the first accommodating space such that the first protector portion remains in the open state, and in the open state, the second connector is disposed within the second accommodating space such that the second protector portion remains in the open state.

7. The top assembly of claim 4, further comprising:

a first sealing member coupled to the first moving end, and a second sealing member coupled to the second moving end, wherein, in the closed state, the first sealing member and the second sealing member are in confronting relation with one another.

8. The top assembly of claim 7, further comprising a liner that covers the holding portion, wherein:

in the open state, the first sealing member engages with the liner such that the first protector portion remains in the open state, and in the open state, the second sealing member engages with the liner such that the second protector portion remains in the open state.

9. The top assembly of claim 1, wherein the holding portion is a rim of the collar.

10. The top assembly of claim 1, further comprising a container coupled to the holding portion.

11. A top assembly configured to couple to a top of a container, the top assembly comprising:

a collar having a holding portion extending in a peripheral direction about a central axis of the collar;

a dispensing portion coupled to the collar;

a first protector portion coupled to the collar and configured to cover at least a portion of the dispensing portion in a first closed state and allow access to the dispensing portion in a first open state, the first protector portion having a first plurality of ribs hingedly connected to the collar and a webbing that connects the first plurality of ribs; and a second protector portion coupled to the collar and configured to cover at least a portion of the dispensing portion in a second closed state and allow access to the dispensing portion in a second open state, the second protector portion having a second plurality of ribs hingedly connected to the collar and a second webbing that connects the second plurality of ribs.

12. The top assembly of claim 11, wherein a first mounting end is coupled to a first half of the collar and a second mounting end is coupled to a second half of the collar.

13. The top assembly of claim 12, further comprising: a third closed state, wherein the first protector portion and the second protector portion are positioned such that an enclosed space is created between the dispensing portion and the first and second protector portions, the dispensing portion being disposed within the enclosed space, wherein, in the third open state, the first plurality of ribs and the second plurality of ribs collapse such that the first protector portion is in confronting relation with the first mounting end and the second protector portion is in confronting relation with the second mounting end.

14. The top assembly of claim 13, further comprising a connecting mechanism comprising a first connector and a second connector, wherein: the first connector is coupled to the first protector portion and the second connector is coupled to the second protector portion; and in the third closed state, the first connector engages with the second connector such that the first protector portion and the second protector portion remain in the third closed state.

15. The top assembly of claim 14, wherein:

the holding portion is a groove in the collar, the holding portion comprises a first accommodating space and a second accommodating space, in the first open state, the first connector is disposed within the first accommodating space such that the first protector portion remains in the first open state, and in the second open state, the second connector is disposed within the second accommodating space such that the second protector portion remains in the second open state.

16. The top assembly of claim 13, further comprising:

a first sealing member coupled to the first protector portion, and a second sealing member coupled to the second protector portion, wherein, when the first protector portion and the second protector portion are in the third closed state, the first sealing member and the second sealing member are in confronting relation with one another.

17. The top assembly of claim 16, further comprising a liner that covers the holding portion, wherein:

in the first open state, the first sealing member engages with the liner such that the first protector portion remains in the first open state, and in the second open state, the second sealing member engages with the liner such that the second protector portion remains in the second open state.

18. The top assembly of claim 11, wherein the holding portion is a rim of the collar.

19. The top assembly of claim 11, further comprising a container coupled to the holding portion.

* * * * *